United States Patent Office 2,808,563
Patented Oct. 1, 1957

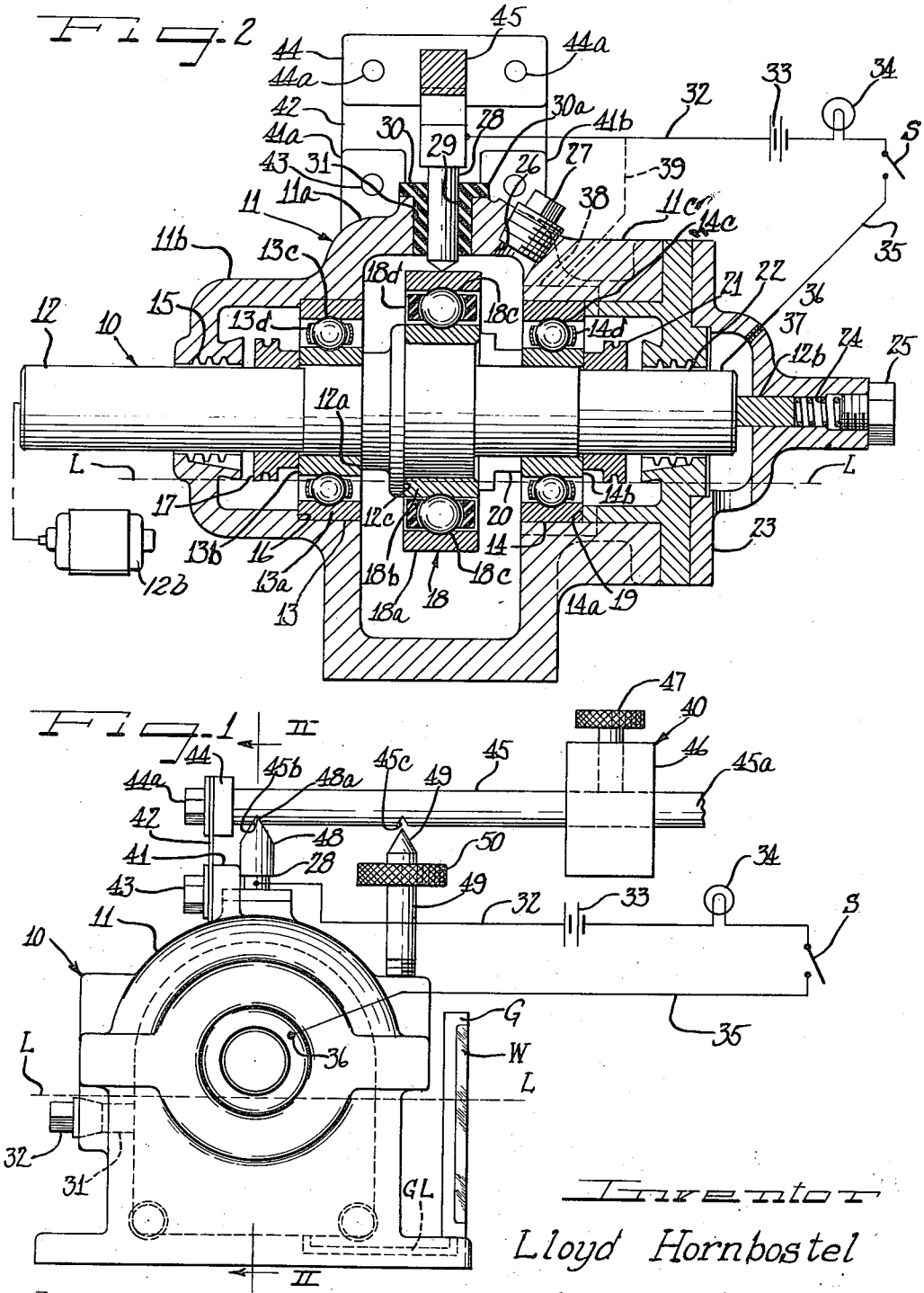

2,808,563

FILM STRENGTH TESTER

Lloyd Hornbostel, Beloit, Wis., assignor to Beloit Iron Works, Beloit, Wis., a corporation of Wisconsin Application June 8, 1954, Serial No. 435,173

9 Claims. (Cl. 324—65)

The instant invention relates primarily to a method and means for determining the character of a lubricant film between bearing surfaces, and more particularly, to a method of determining the film strength under various operating conditions, and to an improved apparatus for determining such film strength.

In heavy machinery, such as that used in the paper-making art, the various bearing assemblies are required to carry extremely heavy loads and, in the event that lubrication should fail in such bearing assemblies, the loss in production time, repair time and parts replacement may be extremely great. In general, the conventional lubricating devices are employed for providing lubricant to the various moving parts and, as those skilled in the art appreciate, the lubricant which is applied to opposed bearing surfaces in "cooperative bearing engagement" is actually applied only in the form of an extremely thin film. Once the load on the cooperating bearing means becomes too great and the film is substantially eliminated, then lubrication between the bearing surfaces ceases and excessive overheating with the resulting destruction of parts takes place.

Although the lubricating properties of the various lubricating oils and greases are known to a certain extent, particularly with respect to light duty lubrication, the rather extreme conditions involved in the operation of certain types of heavy machinery such as paper machines create lubricating conditions or problems which have not yet been explored completely, and the suitability of various lubricants for these rather drastic conditions has not been determined in a number of instances. In other words, the properties of a given lubricant used in light duty lubrication may well have been completely evaluated, so that it is possible to choose the most suitable lubricant for a specific light duty operation. On the other hand, the properties of lubricants under light duty operation do not necessarily reflect their properties in heavy duty operation. Moreover, the characteristics of the various lubricants for heavy duty operation are in most cases substantially unknown. Accordingly, the art has struggled along using a given lubricant if it appears that it is working satisfactorily. A change in design of the paper machine may, however, result in rather drastic differences in the loads at various bearings and the lubricant heretofore used may turn out to be wholly unsatisfactory at this time. Unfortunately, the inadequacy of this lubricant in most cases is not detected until a rather substantial loss is sustained throughed burned-up bearings and general machine breakdown.

The instant invention offers two solutions to the problem. In the first place, the instant invention provides a method and means for actually testing a given lubricant under simulated load and rotating speed conditions to determine whether or not the lubricant is adequate for this purpose. Secondly, the instant invention provides a method and means for effectively signalling to the operator that proper lubrication is failing in a given bearing in a machine in operation. As those skilled in the art will readily appreciate, the first use is of particular importance because it provides information beforehand which may be used to avoid any lubrication breakdown; whereas the second use or feature of the instant invention signals the actual lubrication breakdown and, although this is very useful in minimizing damage, it does not necessarily avoid all damage since some may be caused at the instant of lubrication breakdown.

It is, therefore, an important object of the instant invention to provide an improved method and means for ascertaining the film strength of lubricants.

It is a further object of the instant invention to provide a lubricant film strength tester, which comprises a pair of bearing means cooperatively defining a region of bearing engagement therebetween, drive means connected to one of said bearing means for effecting relative movement between said pair of bearing means, mounting means for the bearing means insulating one bearing means from the other except at the region of bearing engagement therebetween, lubricant retaining means supplying a lubricant film between said bearing means at the region of bearing engagement, and means creating an electric potential difference between said bearing means for detecting the electrical conductivity across the lubricant film.

Still another object of the instant invention is to provide an improved method of testing the film strength of a lubricant, which comprises providing a pair of opposed bearing surfaces, applying a film of lubricant therebetween, urging the bearing surfaces together against the film, and creating an electric potential difference between the surfaces to determine the electrical conductivity of the film.

Other objects, features and advantages of the present invention will become apparent to those skilled in the art from the following detailed disclosure thereof, and the drawings appended hereto which are made a part hereof.

On the drawings:

Figure 1 is an end elevational view of the device of the instant invention, with parts shown diagrammatically; and Figure 2 is a sectional elevational view taken substantially along the line II—II of Figure 1.

As shown on the drawings:

The film strength tester, indicated generally by the reference numeral 10, shown in Figures 1 and 2 comprises a housing, indicated generally by the reference numeral 11 which contains a shaft 12 rotatably carried thereby by means of the ball bearing assemblies 13 and 14 mounted in the housing 11. The housing 11, of course, is closed so as to retain oil or a suitable lubricant therein at the level L—L indicated by the light broken line. The housing comprises an enlarged cylindrical central section 11a, a smaller cylindrical end section 11b at one side and another smaller cylindrical end section 11c at the opposite end. A motor 12b, which may take the form of an electric motor and is shown diagrammatically in Figure 2, may be provided to rotate the shaft 12.

At one end the housing portion 11b converges around the shaft 12 and mounts a suitable packing gland 15 receiving the shaft 12 and preventing oil leakage from within the housing 11. The shaft 12 extends inwardly from the packing 15 to be received by the first ball bearing assembly 13. The ball bearing assembly 13 comprises an outer bearing race 13a snugly fit against the shoulder 16 in the housing portion 11b, an inner bearing race 13b corotatably mounted on the shaft 12 (being retained thereon by the ring 17 which clamps the inner race 13b against the shaft shoulder 12a), a plurality of bearing balls 13c mounted between the inner and outer races 13b and 13a, respectively, and a ball retainer 13d maintaining the balls 13c in position. Next, on the central portion of the shaft 12 passing through the enlarged middle portion 11a of the housing 11 is the test bearing assembly designated generally by the reference numeral 18 which will be described in detail hereinafter. After the test bearing assembly there is positioned on the shaft 12 the second bearing assembly 14, which also mounts the shaft 12 for rotation in the housing 11. The bearing assembly 14 comprises an outer bearing race 14a suitably mounted in the housing end portion 11c against the shoulder 19, an inner bearing race 14b clamped onto the shaft 12 for co-rotation therewith between the rings 20 and 21, bearing balls 14c and a ball retainer 14d. Next, the shaft 12 is received by the packing gland 22 carried by the converging end of the housing end portion 11c. The housing end portion 11c has suitably mounted thereon a cap member 23 (secured thereto by bolts, not shown) which receives the extreme end 12b of the shaft 12 and which mounts coaxially with the shaft 12 a spring 24 held in position by a threaded plug 25 for resisting thrust of the shaft 12 in the direction of the cap 23.

The housing 11 is also provided with an oil inlet 26 and a threaded plug 27 therefor; and, as shown in Figure 1, an oil level gauge G presenting a glass window W is suitably mounted outside the housing GL and communicates with the oil therein through the line 30 so as to give a visual indication of the oil level L—L in the housing 11. Also, as shown in Figure 1, there is an additional oil hole 31 with the plug 32 therefor for removing or adding oil to the housing 11.

Referring now to the test ball bearing assembly 18, which is shown in Figure 2, it will be seen that this ball bearing assembly 18 comprises an inner bearing race 18b which is clamped against the shoulder 12c on the shaft 12 by means of the ring 20 so as to be corotatably mounted with the shaft 12, and an outer bearing race 18a which is mounted "freely" on the bearing assembly 18 and is separated or insulated from the housing 11, except by virtue of the pin 28, whose mounting will be described hereinafter. Bearing balls 18c are positioned between the inner and outer races 18b and 18a, respectively, and the bearing balls 18c are retained in position by a ball retainer 18d which is made of a rigid electrical insulator. In the electrical arts (and as used herein), electrical conductors are usually understood to have resistivities, in microhms per cm.$^3$, of not more than about 100; whereas the resistivities of insulators are usually considered to be at least about $10^5$ ohms per cm.$^3$, and preferably $10^{10}$ ohms per cm.$^3$. In general, the various parts of the housing, shaft, etc. are made of metal and are electrical conductors in this device. So also are the inner and outer bearing races 18b and 18a of the test assembly 18 and the bearing balls 18c. Because of possible movement of the retainer 18d, it is preferable to employ an electrical insulator for this part, so that an electric current flowing from the inner race 18b to the outer race 18a must pass through the balls 18c and thus through the oil film retained on the ball surfaces (and on the bearing surfaces of the inner and outer races 18b and 18a). In this manner, a lubricant film is necessarily provided between the coacting bearing surfaces (considering either the surfaces in "bearing engagement" between the balls and the inner race 18b or the surfaces in bearing engagement between the balls 18c and the outer race 18a.

The pin 28, which is a metal conductor such as steel, extends downwardly through the top of the central housing portion 11a, being seated in an aperture 29 (and slidably received thereby) defined by a structural insulator 30, which in turn is seated in the aperture 31 in the top of the central housing portion 11a. The structural insulator 30 is a generally annular member provided with shoulders 30a to retain the same in position in the aperture 31 and to insulate the pin 28 from the remainder of the housing 11. The insulator plug 30 and the insulator ball retainer 18d may be made of any suitably strong insulator, such as commercial "Micarta" which is a heavy duty thermoset plastic material made from fabric or paper impregnated with phenol-formaldehyde resins and compressed under heat into a permanently solid substance with high structural and dielectric properties. Any other insulator, even including wood or the like, may be used as long as it provides the rather nominal strength required in the particular uses here involved.

The pin 28 makes electrical contact with the outer bearing race 18a and extends out through the housing 11a to make electrical contact with a lead wire 32, which forms a part of the circuit including a source of electric power 33 (shown as batteries), an electric current-responsive signal means 34 (shown as a light), a switch S, and a return lead line 35. For practical purposes, the return lead line 35 could merely be connected to the housing 11, but in order to make a more perfect electrical connection, the return lead line may pass through an insulator plug 36 in the housing cap 23 and connect to a brush 37 which engages the rotating shaft 12 to make electrical contact therewith. The shaft 12, of course, makes electrical contact with the inner bearing race 18b. It will thus be seen that, when the switch S is closed, the only thing that keeps the circuit open is the oil film between the surfaces in bearing engagement on the races 18a and 18b and the balls 18c. In this arrangement, it is possible to test before the machine starts to see whether or not there is adequate lubrication in the form of the necessary oil film. If no film is present between the faces in bearing engagement, then the light 34 will indicate this. Once the shaft 12 is started rotating (thus moving the bearing faces or surfaces relative to each other), it is again possible to test for the presence of the necessary lubricating film at various rotating speeds for the shaft 12.

A further and particularly important feature of the instant invention resides in the means for loading the bearing assembly 18 to develop simulated load conditions for actual operation. As will be appreciated, in the actual operation of a machine, the inner bearing races are loaded against the outer bearing races, or vice versa by virture of the weight of the shaft 12 and equipment carried thereby, the housing 11 usually being positioned in a stationary location and the variable in loading results from variations in the equipment carried by the shaft 12. In the device here shown, this sort of operation would, of course, not result in any loading of the bearing assembly 18, and only the bearing assemblies 13 and 14 would resist the loading effect imparted by the weight carried by the shaft 12. In order to determine whether or not lubrication is in fact being carried out in the bearing assemblies 13 and 14, it would be necessary to mount one of these bearing assemblies with the proper insulation and connect the same to the circuit hereinbefore described. As will be appreciated from the foregoing discussion, the insulative mounting is necessary. Referring briefly to Figure 2, it will be noted that a generally annular collar of insulative structural material, designated in the light-lines at 38 is provided to carry the outer bearing race 14a of the bearing assembly 14 in the housing portion 11c and insulate the same therefrom. An insulative ball retainer 14d would also be preferable. The lead line 39 (also shown as a dotted line) could thus be used to interconnect the circuit line 32 with the outer bearing race 14a, as those skilled in the art will readily appreciate. In this modified structure employing the parts 38 and 39, it will be appreciated that the actual lubricating film present during ordinary operations can be determined and as soon as lubrication fails the light 34 signals the same to the operator. As previously indicated, this arrangement involving the parts 38 and 39 is effective and is particularly useful in avoiding damage to operating machinery.

Because it is even more important to prevent even the initial lubricating film breakdown which the arrangement just mentioned would signal, the test loading device of the instant invention is of particular importance. The test loading device is best shown in Figure 1 and is indicated generally by the reference numeral 40. Near the top of the housing 11 there is mounted a plate 41 (providing upstanding ears 41a and 41b, as shown in Figure 2). A strip of insulating material 42 is suitably clamped at the bottom end thereof to the plate 41 by means of the bolts 43. At the top of the insulating strip 42, a second plate 44 is secured thereto by means of the bolts 44a. The plate 44 has a horizontally extending arm 45 which carries at the extreme end 45a a weight 46 which is slidably mounted on the arm 45 for movement longitudinally of the arm 45 and may be locked in position by the set bolt 47 carried thereby. The pin 28 is provided with a fulcrum member 48 mounted on top of the pin 28 and extending upwardly to engage a groove 45b at the tapered end 48a thereof. The groove 45b in the arm 45 is, of course, positioned a predetermined distance from the lever point at the outer edge of the plate 44 (provided by the insulating strip 42) and the distance from the groove 45b to the weight 46 can be readily determined, so it is possible to make an accurate determination as to the exact amount of load being applied through the pin 28 to the bearing assembly 18. In this way, the instant device may be run as a testing device to determine the load which various lubricants will stand up under at various rotating speeds for the shaft 12.

Also, adjustments in the oil level L—L can be made during operating of the test device at various loads so as to determine the effect of changes in the oil level L—L. To complete the test assembly, a supporting arm 49 (Figure 2) is mounted on the housing 11 and provided with adjusting means, in the form of the screw 50 for axial movement of the arm 49, so that the top portion 49a may be moved upwardly to seat in the groove 45c in order to relieve the load on the pin 28, when such is desired.

In the operation of the instant device heretofore the lubricant has been considered to be an insulator which substantially prevents current flow thereacross; but a lubricant which is a slight (although relatively poor) conductor may be used, since the lubricant film breakdown to permit metal-to-metal contact will permit such a much greater current flow through the circuit that the difference in brightness of the light would be evident. More sensitive signal means may also be used (such as an ammeter).

It will be understood that modifications and variations may be effected without departing from the scope of the novel concepts of the present invention.

I claim as my invention:

1. In a lubricant film strength tester, a pair of bearing means cooperatively defining a region of bearing engagement therebetween, drive means connected to one of said bearing means for effecting relative movement between said pair of bearing means, mounting means for the bearing means insulating one bearing means from the other except at the region of bearing engagement therebetween, lubricant retaining means supplying a lubricant film between said bearing means at the region of bearing engagement, loading means on the mounting means applying a force to urge the bearing means together, adjusting means movable on the loading means to selectively alter the force applied thereby, for measuring the force applied and means creating an electric potential difference between said bearing means for detecting the electrical conductivity across the lubricant film, whereby the breakdown point of the lubricant film may be accurately determined.

2. In a lubricant film strength tester, a pair of bearing means cooperatively defining a region of bearing engagement therebetween, mounting means for the bearing means insulating one bearing means from the other except at the region of bearing engagement therebetween, lubricant retaining means supplying a lubricant film between said bearing means at the region of bearing engagement, loading means on the mounting means applying a force to urge the bearing means together, adjusting means movable on the loading means to selectively alter the force applied thereby, for measuring the force applied and means creating an electric potential difference between said bearing means for detecting the electrical conductivity across the lubricant film, whereby the breakdown point of the lubricant film may be accurately determined.

3. In a lubricant film strength tester, a pair of bearing means cooperatively defining a region of bearing engagement therebetween, loading means connected to said bearing means urging one of said bearing means against the other at the region of bearing engagement therebetween, means for measuring the force of said loading means, drive means connected to one of said bearing means for effecting relative movement between said pair of bearing means, lubricant retaining means supplying a lubricant film between said bearing means at the region of bearing engagement, and means creating an electric potential difference between said bearing means for detecting the electrical conductivity across the lubricant film as a measure of the behavior of the lubricant film under varying pressure conditions.

4. In a lubricant film strength tester, a pair of bearing means cooperatively defining a region of bearing engagement therebetween, loading means connected to said bearing means urging one of said bearing means against the other at the region of bearing engagement therebetween, means for measuring the force of said loading means, mounting means for the bearing means insulating one bearing means from the other except at the region of bearing engagement therebetween, lubricant retaining means supplying a lubricant film between said bearing means at the region of bearing engagement, and means creating an electric potential difference between said bearing means for detecting the electrical conductivity across the lubricant film.

5. In a lubricant film strength tester, an inner bearing race, an outer bearing race cooperating therewith, bearing balls or rollers mounted therebetween, an insulator ball or roller retainer maintaining the balls or rollers in position, lubricating means associated therewith for applying a lubricant film to a load area between the bearing surfaces, means urging the bearing races together to selectively increase and decrease the load at the load area, and an electric power source creating a potential difference between the inner and outer bearing races for detecting flow of electric current through the bearing parts and lubricant in the load area.

6. In a lubricant film strength tester, an inner ball bearing race, an outer ball bearing race cooperating therewith, bearing balls mounted therebetween, an insulator ball retainer maintaining the balls in position, lubricating means associated therewith for applying a lubricant film to the ball surfaces, loading means urging the bearing races together, means movable on said loading means for selectively increasing and decreasing the force with which said loading means urges the bearing means together, an electric power source creating a potential difference between the inner and outer bearing races, and signal means responsive to the flow of current from one race to the other for indicating current flow through the lubricant film.

7. In a lubricant film strength tester, an inner ball bearing race, an outer ball bearing race cooperating therewith, bearing balls mounted therebetween, an insulator ball retainer maintaining the balls in position, lubricating means associated therewith for applying a lubricant film to the ball surfaces, means for rotating one of said races relative to the other, loading means urging the bearing races together, means movable on said loading means for selectively increasing and decreasing the force with which said loading means urges the bearing means together, and an electric power source creating a potential difference between the inner and outer bearing races for detecting flow of electric current through the lubricant film on the ball surfaces.

8. In a lubricant film strength tester, a shaft mounted for rotation, means for rotating said shaft, an inner bearing race carried on said shaft, an outer ball bearing race cooperating therewith, bearing balls mounted therebetween, an insulator ball retainer maintaining the balls in position, lubricating means associated therewith for applying a lubricant film to the ball surfaces, means loading the outer race against the inner race carried by the shaft, and an electric power source creating a potential difference between the inner and outer bearing races for detecting flow of electric current through the lubricant film on the ball surfaces.

9. In a lubricant film strength tester, a housing, a shaft rotatably carried by said housing, an inner bearing race corotatably carried by the shaft, an outer ball bearing race cooperating therewith, bearing balls mounted therebetween, an insulator ball retainer maintaining the balls in position, lubricating means associated therewith for applying a lubricant film to the ball surfaces, means carried by the housing insulating the outer bearing race from the inner bearing race and shaft, means carried by the housing and insulated therefrom applying a load on the outer bearing race against the inner bearing race, and an electric power source creating a potential difference between the inner and outer bearing races for detecting flow of electric current through the bearing and lubricant film on the ball surfaces.

References Cited in the file of this patent

UNITED STATES PATENTS

| | | |
|---|---|---|
| 1,989,627 | Sage | Jan. 29, 1935 |
| 1,996,063 | Corkran | Apr. 2, 1935 |
| 2,067,996 | Werder | Jan. 19, 1937 |
| 2,132,347 | Anderson | Oct. 4, 1938 |
| 2,337,414 | Rieber | Dec. 21, 1943 |